United States Patent [19]
Dunfield et al.

[11] Patent Number: 5,808,839
[45] Date of Patent: Sep. 15, 1998

[54] DISC DRIVE CARTRIDGE INCLUDING MAGNETIC BEARINGS

[75] Inventors: John Charles Dunfield, Santa Cruz; Kamran Oveyssi, Aptos, both of Calif.

[73] Assignee: Seagate Technology, Inc., Scotts Valley, Calif.

[21] Appl. No.: 714,507

[22] Filed: Sep. 16, 1996

Related U.S. Application Data

[63] Continuation of Ser. No. 478,269, Jun. 7, 1995, abandoned, which is a continuation of Ser. No. 328,369, Oct. 25, 1994, abandoned, which is a continuation of Ser. No. 305,034, Sep. 13, 1994, abandoned.

[51] Int. Cl.[6] ........................................................ G11B 5/55
[52] U.S. Cl. ................................................................ 360/106
[58] Field of Search ..................... 384/133, 446, 384/907; 360/99.12, 98.07, 99.08, 104–106; 310/67 R, 90.5

[56] References Cited

U.S. PATENT DOCUMENTS

| | | | |
|---|---|---|---|
| 5,012,359 | 4/1991 | Kohno et al. | 360/71 |
| 5,041,935 | 8/1991 | Aruga et al. | 360/106 |
| 5,050,026 | 9/1991 | Goss | 360/106 |
| 5,152,679 | 10/1992 | Kanemitsu et al. | 417/423.4 |
| 5,541,460 | 7/1996 | Dunfield et al. | 310/67 R |
| 5,561,335 | 10/1996 | Dunfield et al. | 310/90.5 |
| 5,598,048 | 1/1997 | Dunfield et al. | 310/90.5 |

*Primary Examiner*—Stuart S. Levy
*Assistant Examiner*—David D. Davis
*Attorney, Agent, or Firm*—Flehr Hohbach Test Albritton & Herbert LLP

[57] ABSTRACT

A disc drive cartridge is disclosed comprising a central actuator arm pivot hub mounting one magnetic pole, which in turn rotates within and overlaps a u-shaped upright base and sleeve supporting a second non-aligned magnetic pole. The system relies on the radial repulsive forces of the separate magnetic poles to achieve significant radial stability; in certain embodiments, attractive forces between axially aligned magnetic poles or a magnetic pole and a sleeve of high permeability magnetic material are also utilized to enhance the axial stability of the system. The rotating hub supports on one side one or more actuator arms and on the other side a coil of a voice coil motor, so that this magnetic bearing can be the central pivot for a very small compact and low noise disc drive cartridge.

31 Claims, 10 Drawing Sheets

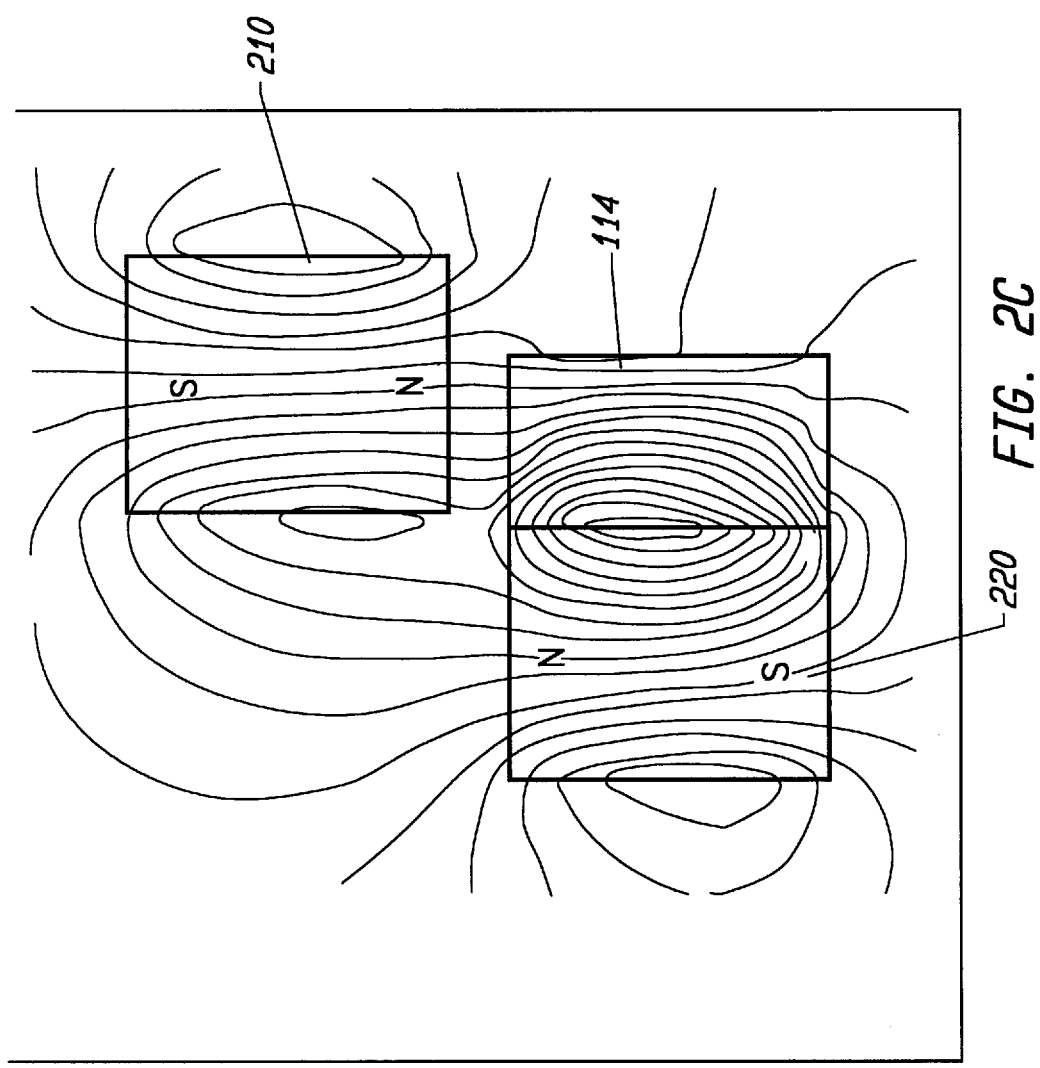

DISC DRIVE CARTRIDGE INCLUDING MAGNETIC BEARINGS

This is a continuation of application Ser. No. 08/478,269 filed Jun. 7, 1995 now abandoned which is a continuation of application Ser. No. 08/328,369 filed Oct. 25, 1994 now abandoned which is a continuation application of Ser. No. 08/305,034, filed on Sep. 13, 1994 now abandoned.

The present invention relates generally to an improved actuator pivot for a disc drive utilizing magnetic bearings for a support at the pivot which supports the coil of the voice coil motor, the actuator arm, and the transducer for the information storage device.

BACKGROUND OF THE INVENTION

The present invention provides an improvement to an information storage system in which ball bearings are utilized to journal about a shaft. The embodiments of the present invention are designed to incorporate a magnetic bearing in an actuator. Such are especially useful in information storage systems such as disc drives.

Overall disc drive size is of paramount concern to the disc drive design engineers. As smaller, light weight, portable computers have grown in demand, the disc drive engineer has continually searched for ways to reduce both the overall size, weight, and friction of the disc drive while maintaining or improving. overall drive performance. Improved performance includes significant increases in data storage densities as measured both in terms of bits per inch and tracks per inch. Typically in the prior art ball bearings were used to support the actuator arm for rotation to move a transducer over the disc. Such pivot assemblies are subject to very rapid, repetitive movements about the hub or pivot.

However, the use of conventional ball bearing assemblies in conjunction with high rotational speed devices has evidenced problems which are deleterious to drive system performance. Specifically, conventional mechanical bearings used are subject to metal wear, vibration/shock, have higher acoustics, friction problems and grease out gassing. Further, the relatively high conlomb friction associated with such bearings limits the bandwidth of the servo system used to keep the transducer aligned with the track, making it difficult for the transducer to follow small errors in the track being accessed.

In order to alleviate the problems associated with conventional mechanical bearings, magnetic bearings may be substituted, thereby improving overall system performance. The use of magnetic bearings to improve disc drive system performance was disclosed in the concurrently filed U.S. patent application Ser. No. 08/201,676 entitled "Passive Magnetic Bearings for a Spindle Motor" by Dunfield et al., and is expressly incorporated herein by reference.

Finally, disc drives are designed to sustain mechanical shocks. This is especially true in drives designed for uses in portable computers and disc drive systems. Mechanical bearings maintain a hard contact interface between the stationary and rotating assembly and thereby provide a rigid interface. Accordingly, shocks received by the stationary parts are transferred to the rotating parts and conversely. In order to minimize these shocks, shock mitigation means may be employed to dampen the shocks seen by the overall unit. However, the use of magnetic bearings raises different problems. Since the mechanical rigid interface between the pivot and actuator arm no longer exists, ordinary shock mitigation means which dampen the shocks to the entire motor assembly are no longer sufficient. This is because without the hard mechanical interface between the pivot and actuator arm found in a mechanical bearing configuration, the magnetic bearings tend to isolate the actuator arm from any mitigation or dampening that conventional shock mitigation means provide. Unfortunately, most magnetic bearings exhibit very low dampening characteristics. As such, a magnetic bearing would ordinarily provide insufficient dampening of shocks received, and thereby deleteriously affect actuator arm operation in the high shock environments. The magnetic bearing shock issue is resolved by axial mechanical containment with contact on or near the bearing spin axis and magnetic bearing suspension for the radial motion.

SUMMARY OF THE INVENTION

It is the object of the present invention to provide an apparatus for rotatably journaling an actuator arm about a shaft by means of a magnetic bearing assembly integral to an arm motor pivot assembly.

It is another object of the present invention to provide a radially and axially stable bearing assembly for use in a disc drive pivot assembly.

It is another object of the present invention to provide a bearing assembly for use in a disc drive that provides damping from repeated shocks.

It is a further object of the present invention to provide a balanced bearing assembly for use in a disc drive which has minimal losses and a substantially improved non-repeatable run-out characteristic as compared to prior art ball bearing systems.

It is a further object of the present invention to provide a magnetic bearing system for use in a disc drive in which physical size is optimized while providing sufficient directional stiffness.

It is a further object of the present invention to provide a low noise bearing system for minimizing the audible acoustic noise attributable to the operation of the bearing system.

It is a further object of the present invention to provide a bearing assembly for use in a disc drive which has minimal and stable vibration generation characteristics as compared to prior art ball bearing systems.

Another objective of the invention is to adopt a configuration which leads to lower contamination, specifically a reduction in grease contamination due to outgassing.

It is an object of the present invention to minimize the friction in the bearing assemblies of actuator arm pivots to thereby extending bearing life and maximizing the mean time before failure for the bearing assembly.

It is a related object of this invention to substantially decrease or eliminate the conlomb friction associated with designs using mechanical bearings. This allows the use of increased bandwidth in the track following servosystem, enhancing the ability of the actuator to follow small deviations in the track being accessed, and increasing the accessible tracks per inch.

In accordance with these and other objects of the invention, an apparatus is provided comprising a central actuator arm pivot hub mounting one magnetic pole, which in turn rotates within and overlaps a u-shaped upright base and sleeve supporting a second non-aligned magnetic pole. The system relies on the radial repulsive forces of the separate magnetic poles to achieve significant radial stability; in certain embodiments, attractive forces between axially aligned magnetic poles or a magnetic pole and a sleeve of high permeability magnetic material are also utilized to enhance the axial stability of the system. The rotating hub supports on one side one or more actuator arms and on the other side a coil of a voice coil motor, so that this magnetic bearing can be the central pivot for a very small compact and low noise disc drive cartridge.

BRIEF DESCRIPTION OF THE DRAWINGS

Additional objects and features of the present invention will be more readily apparent from the following detailed description and appended claims when taken in conjunction with the drawings wherein:

FIG. 2C is a chart of the flux patterns generated by the magnets used in the magnetic bearing hub of the embodiment of FIG. 2A;

DETAILED DESCRIPTION OF A PREFERRED EMBODIMENT

A magnetic bearing assembly for use in a thin cartridge style information disc storage unit is described below. In the following description, specific details may be set forth such as dimensions, material types, spacings and the like in order to provide a better understanding of the present invention. However, it is obvious to one skilled in the art that the invention may be practiced without adhering to these specific details, unless otherwise expressly noted in the text of the application. In other instances, well known elements and processing techniques have not been shown in particular detail in order to avoid unnecessarily obscuring the present invention.

Figure 1A:
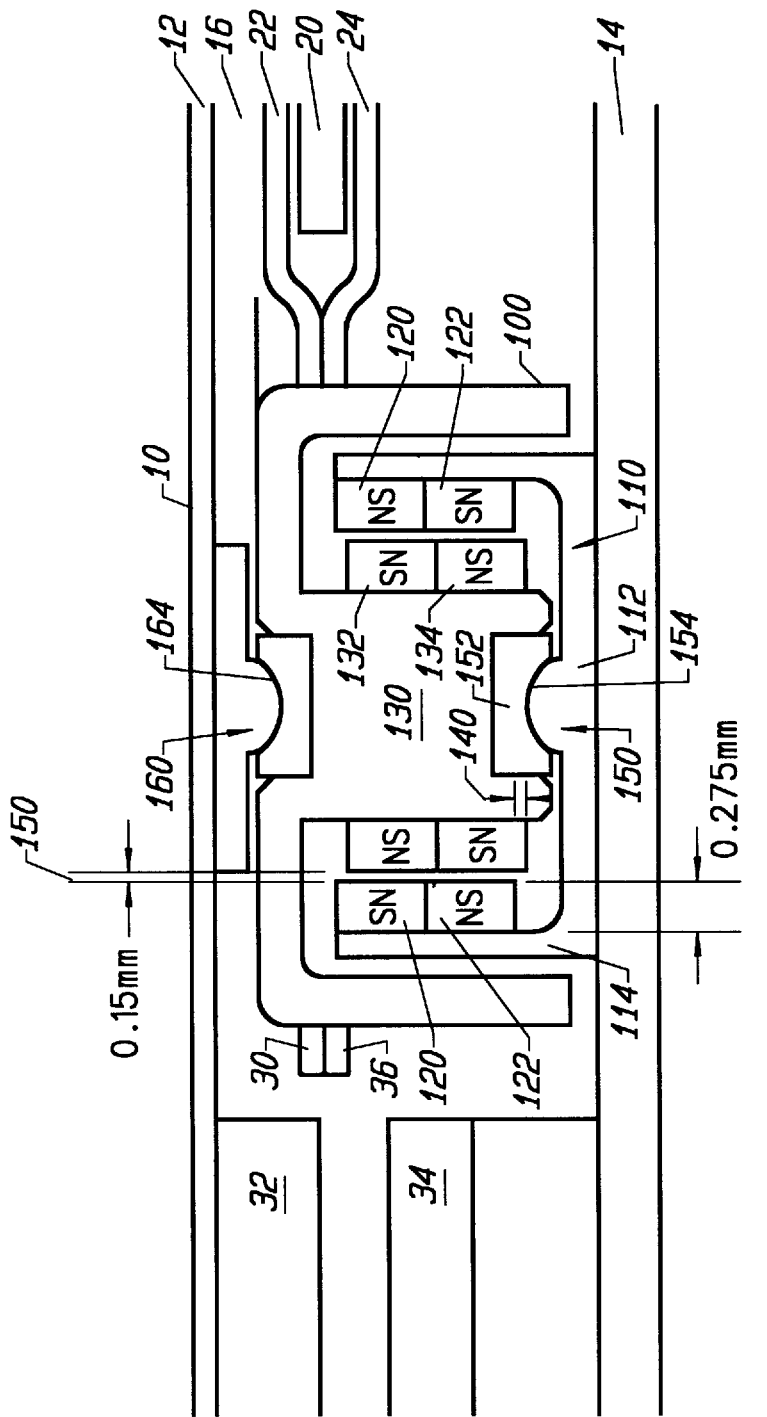
FIG. 1A is a vertical sectional view of an information storage disc cartridge in accordance with the present invention utilizing a first embodiment of the magnetic bearing hub.

Thus, FIG. 1A is a cross-sectional side view of an information storage unit 10 incorporating the magnetic bearing assembly of the present invention in a preferred form (FIGS. 2A and 3A) show two alternative embodiments of the magnetic bearing actuator support). The information storage unit includes a top cover plate 12 which is securely attached to a baseplate 14 by means of screws and the like (not shown) disposed about the peripheral areas of the plate. Typically, baseplate 11 and top cover 12 are a metal or metal alloy such as aluminum, although other rigid materials may also be used. When assembled, the two plates form an airtight central cavity therebetween where one or more discs 20 may be mounted for the storage of data. The disc or discs 20 are supported by a spindle motor for rotation at a constant speed within the cavity. As is well known in the information recording art, a rigid disc 20 commonly comprises a magnetic surface material suitable for storage of information in the form of magnetic transitions. In other instances, disc 20 may comprise magnetic, optical or other similar materials useful for long-term information storage. In either event, such discs, and the spindle motor for mounting and supporting such discs for high speed rotation are well known and need not be disclosed in detail in this invention.

The actuator arm assembly used for positioning one or more transducers over the disc 20 has not been shown in FIG. 1A (or FIGS. 2A or 3A) for reasons of clarity. Such actuator arms 22, 24 are generally provided supported from the hub 100 and moving to position a supported transducer at a desired location over the surface of the disc. Implementation of such an arm assembly is considered to be well within the skill of the art and therefore is not shown in detail herein. Likewise, a motor assembly 30, briefly indicated to the left of the hub 100 generates generally the motor assembly 30, comprises stator magnets 32, 34 and coil windings 36 mounted to the side of the hub opposite the actuator arm for generating movement of the actuator arm and the transducer it supports over the disc 20 rotational movement of the hub 100 relative to the top 12 and bottom 14 of the cartridge assembly. Further detail of these elements is not shown, since incorporation of these elements into the information storage unit of FIG. 1 is considered will within the skill of the art.

Turning next to details of the hub assembly 100, it comprises a U-shaped magnet support 110 including a base portion 112 and upright sleeve 114. The upright sleeve supports a pair of radially magnetized, axially aligned, poles 120, 122. The poles 120, 122 are annular or disc shaped to surround the hub 130. Central hub 130 supports a pair of radially magnetized axially aligned disc shaped poles 132, 134. These magnet poles are mounted to be in repulsion with the sleeve magnet poles 120, 122. The pole pairs 121, 122 and 130, 132 are mounted to be generally radially aligned but axially offset from each other by a distance 140. In a typical exemplary embodiment, a typical one of the disc shaped poles 120 or 132 would have an axial dimension of 0.75 millimeters; the offset between the inner pole pair and the outer pole pair would be about 0.15 millimeters, creating an offset of about ⅕ the height of said disc shaped poles. It should be noted that the width of these exemplary pole pieces is about 0.375 millimeters, and the gap 150 between the opposing pole pieces is about 0.15 millimeters.

As noted above, the inner pole pair is axially offset from the outer pole pair 120, 122. This offset creates a shearing, axial force or a preload force which tends to return or maintain the hub and shaft to their original, relative locations in the event of a shock, force.

The second reason for the offset is to create further enhanced stability. If there were no offset, since the pole pairs are repelling each other, they would have a tendency to shear horizontally to one side or the other of their horizontal alignment axis. That is, the shearing force could potentially operate in either direction, either holding the hub and sleeve together or forcing them apart. By adopting vertical offset of one pole pair relative to the other, in addition to the preloading benefit, this tendency toward shearing is eliminated.

By creating the predefined offset, also, placing the hub pole pair offset below the sleeve pole pair or toward the base 110 forces the hub 130 toward the base 110; as a result, the downward axial force on the hub 130 toward the base element 110 is already defined and will be of significant aid in holding the pieces of the pivot hub together. That is, the repulsion of the pole pair 132, 134 as it attempts to move up into alignment with the pole pair 120, 122 (eliminating the offset 140) becomes greater, forcing the hub 130 back toward the base 110 and maintaining the stability of the overall system. This same force would also tend to diminish and overcome any tilting or other offset. Finally, the cartridge or hub 130 is supported by an upper and lower ball and socket arrangement 150, 160. As shown in the Figure, the hub 130 includes a pair of spherically shaped sockets 152, 162 located on opposite sides (i.e. in the top and bottom surfaces) of the hub body. These sockets are centrally located along a longitudinal axis of the hub. Disposed within each of the spherically shaped sockets 162 is a ball shaped protrusion 154, 164 which is aligned with the center of the cooperating socket 152, 162 to form a bearing mechanism within the socket 150, 160. The actual form of this ball and socket arrangement is not shown in detail, as such arrangements whether based on ball and socket, point contact, a ruby ball as shown in the incorporated application, or the like are well known in such technology and does not form a critical feature of the present invention. However, it is readily apparent that some tolerances exist in these upper and lower ball and socket arrangements and potentially there could be a tendency for actuator arm to move radially over the disc. The use of the disc shaped pole pairs in the magnetic bearing, utilizing repulsion forces, prevents such movement or causes a quick return of the hub to its normal position if it is dislodged by a shock. Thus, the disclosed magnetic bearing provides radial stiffness, maintaining the accurate alignment which is necessary to successfully operate an information storage device such as this over an extended period.

If a greater degree of stiffness is desirable, then more magnetic rings may be added, then the pole pairs 120, 122, 132 and 134 may be supplemented or replaced by added magnetic rings 121, 123, 125, and 127 cooperating with offset, oppositely polarized pairs 129, 131, 133, 135. There is in any design an upper limit to the effective number of rings which can be determined, largely by experiment.

Figure 1B:
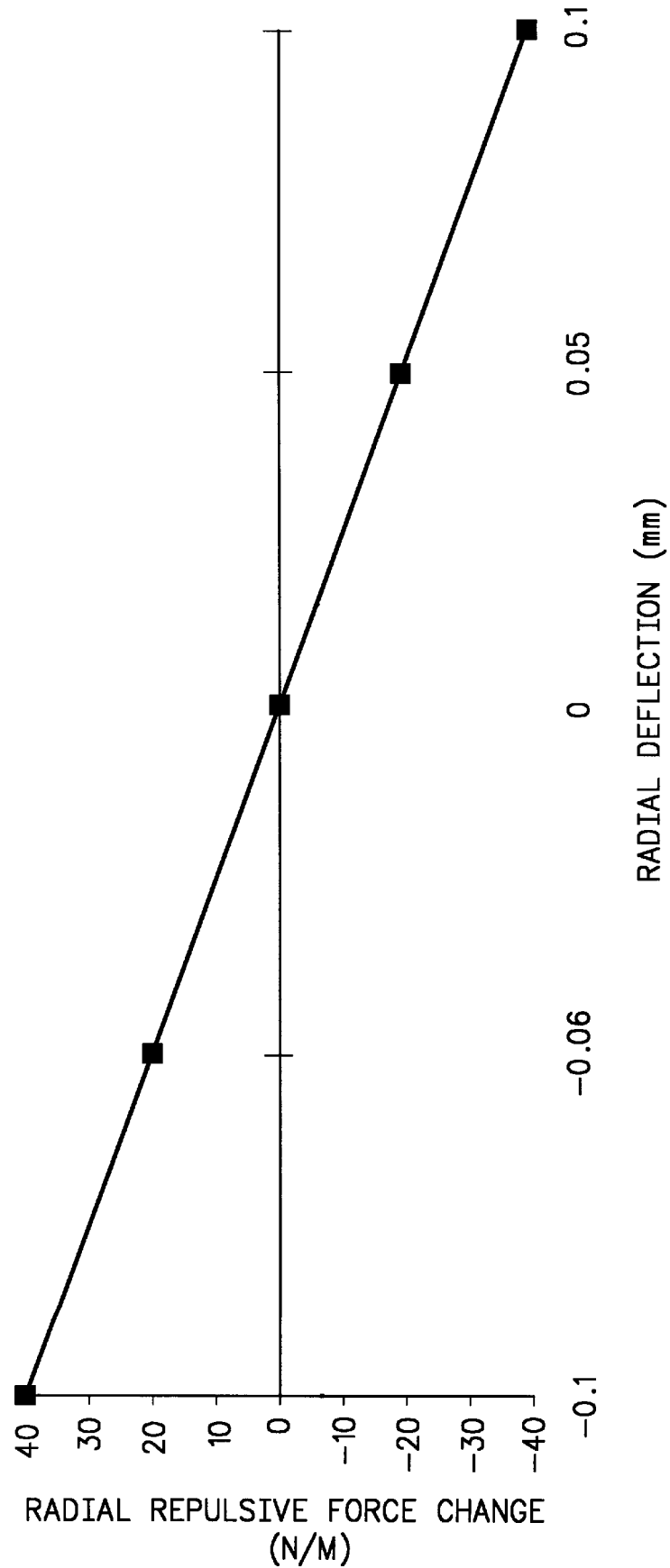
FIG. 1B is a graph of the radial repulsive forces vs. deflection distance for the configuration of FIG. 1A.

The effectiveness of the above described design is demonstrated by a test of a typical system, the results of which are shown in FIG. 1B. This graph, which has a negative slope, shows that with any increase in deflection, the system will always attempt to go back to its stable point rather than maintaining it in the deflected mode or even increasing the deflection. Thus, for example, the system starts at zero; should it be moved to a deflection of 0.05 millimeters, then a force per unit length and depth of 20N/M would be imposed on the hub to move it back to its stable point. The deflection which is being measured therein is a tilting of the hub.

Figure 1C:
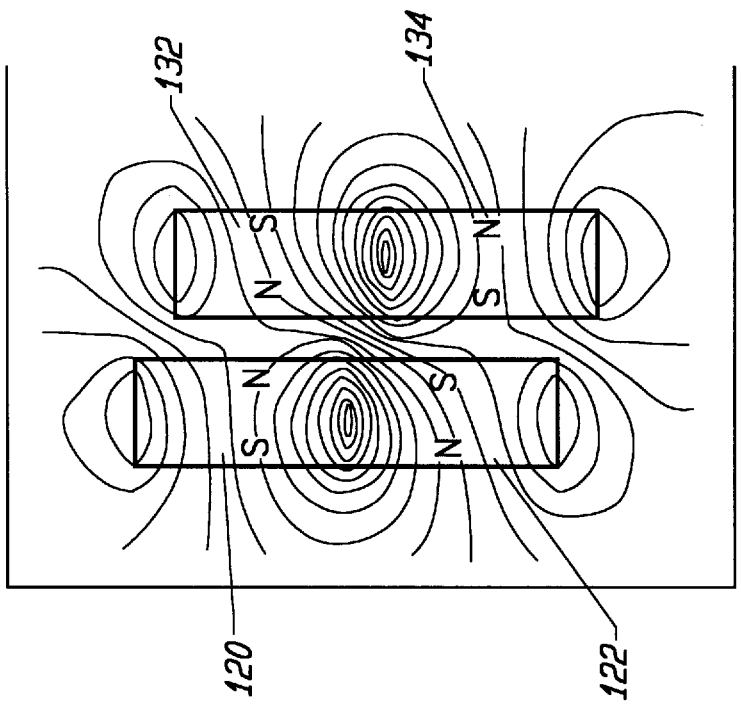
FIG. 1C is a chart of the flux patterns generated by the magnets used in the magnetic bearing hub of the embodiment of FIG. 1A.
Figure 1D:
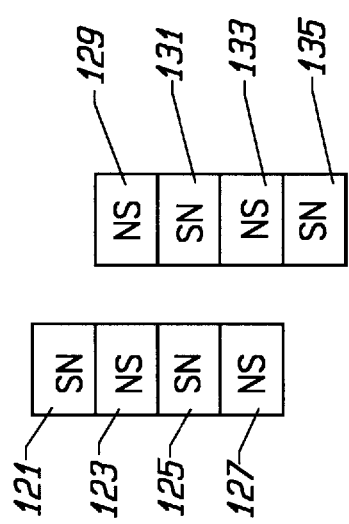
FIG. 1D is a partial section of FIG. 1A illustrating an alternative embodiment.

Referring next to FIG. 1C, the magnets 120, 122 and 132, 134 are shown with their lines of force essentially closed on the magnets themselves. That is, the fluxes from the magnets are trying to get away from each other. This represents the strong repulsive forces which are established between the two pole pairs, as well as the shearing forces, which are set up to maintain the stability of the overall system of FIG. 1A.

Figure 2A:
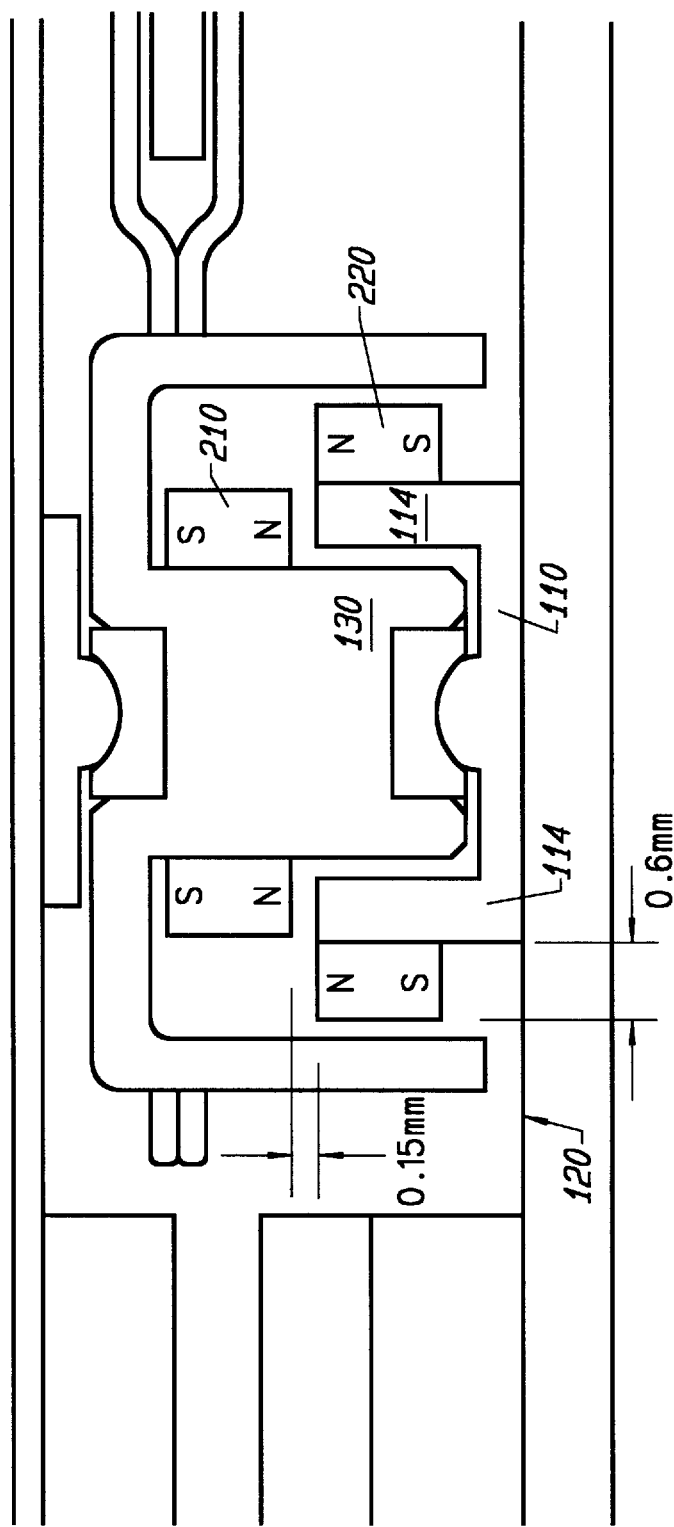
FIG. 2A is a vertical sectional view of an information storage disc cartridge in accordance with the present invention utilizing a second embodiment of the magnetic bearing hub.
Figure 2B:
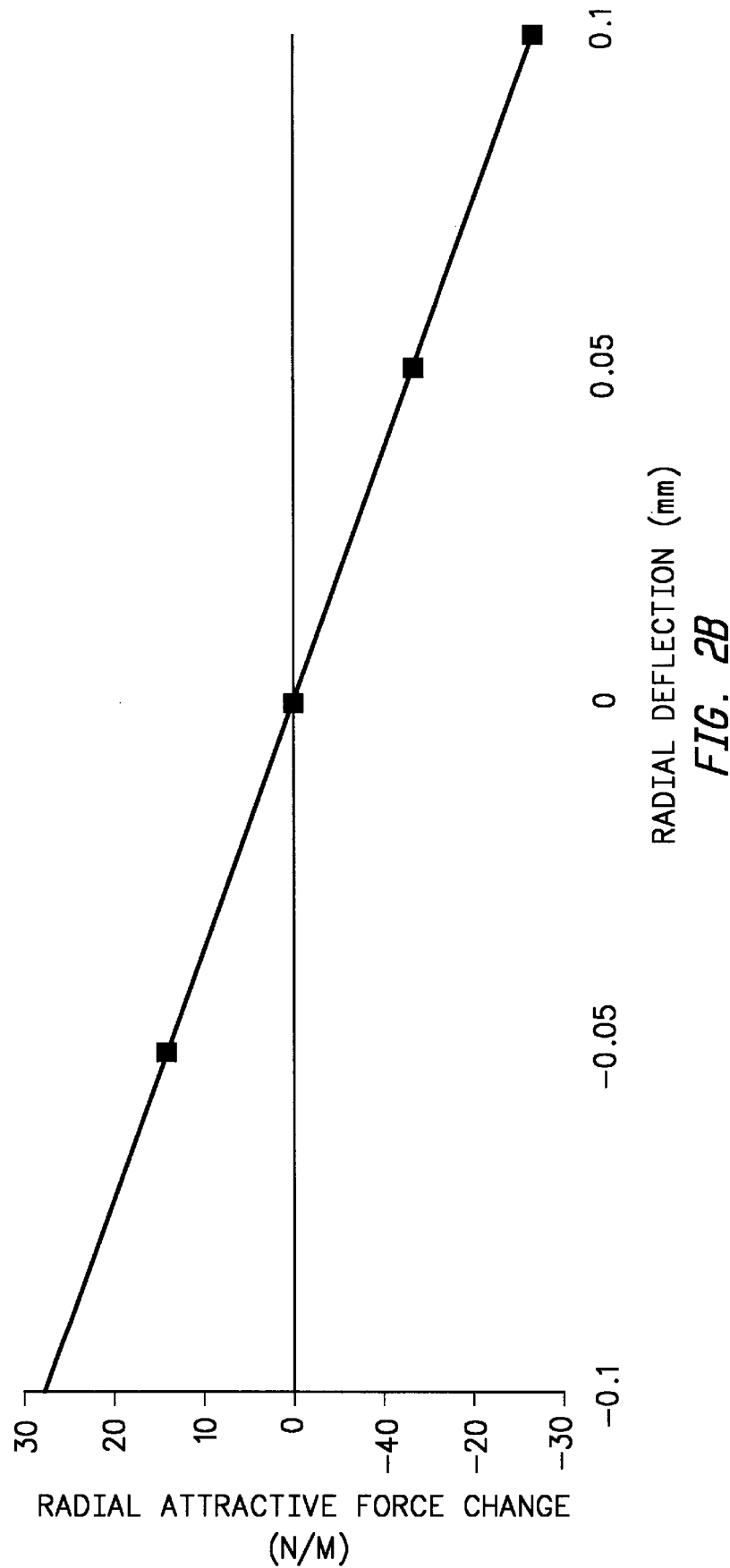
FIG. 2B is a graph of the radial repulsive forces vs. deflection distance for the configuration of FIG. 2A.

Referring next to FIG. 2A, the embodiment shown and described therein (and in FIGS. 2B and 2C) is in most respecters similar to the embodiment previously described except for changes which will be specifically noted below which have primarily to do with the mounting and positioning of the magnets. In this case, it can be seen that a single disc shaped pole pair 210 is mounted on the outside of the hub cartridge, axially aligned with the upright arms or sleeve 114 of the base support piece which is formed of a magnetic material. As opposed to FIG. 1A, where a disc shaped pole pair is shown mounted on the inside of this base support, in FIG. 2A pole is shown 220 is mounted on the outside surface of the upright arms 114 of the support 110. It can be seen that the pole piece 210 will be attracted to the magnetic material of the arm sleeve 114 creating an axially attractive force. However, the outer pole 220 is mounted to repel the inner pole 210 so that repulsive forces in the radial direction are created in this embodiment. This centers the hub 130 relative to the base support sleeve 110, 114, preventing misalignment of the hub and the actuator arm it supports. At the same time, stability of the hub against tilting or rocking is created by the attraction of the pole piece 210, the magnetic material of the sleeve 114. Referring to FIG. 2C, it is immediately apparent that the lines of flux from the north pole of the magnet 210 are going in a generally straight path through the steel sleeve piece 114 to the south pole of the magnet 220. Thus the permeability of the steel enhances the attractive forces between the hub mounted pole and the sleeve mounted pole. The graph of FIG. 2B illustrates the effectiveness of this design in preventing radial deflection; thus if the magnetic pole disc of magnet 210 moves relative the lower sleeve mounted magnet 220 in the radial direction, the magnetic repulsion forces will oppose any such movement and push the hub back towards a centered position.

In some embodiments of the invention, it may be desirable to make the upright sleeve 114 which surrounds the hub of a non-magnetic material. In such an embodiment, only repulsion of magnets 210, 220 would be relied on for stiffness of the system.

Turning next to the embodiments shown in FIGS. 3A through 3C, once again the major physical components remain the same.

These figures show a further alternative embodiment, having many similarities in the alignment of the magnets to the embodiment discussed with respect to FIG. 2. However, because of certain changes made in this embodiment, it is more effective in providing a strong axial force on the pivot or preload. Specifically, the hub mounted magnetic pole 310 is mounted from a top horizontal surface portion 312 of the hub, as well as an interior shoulder 314 of the non-magnetic hub 130. This mounting arrangement is adopted to strongly align this magnetic pole 310 directly over an oppositely polarized vertically aligned magnetic pole 320 supported on the top of the sleeve and having substantially the same radial dimension as the hub pole 310. The sleeve mounted, vertically aligned magnetic pole is mounted immediately adjacent a second oppositely oriented magnetic pole 310. This oppositely aligned pole is mounted radially outside of the hub mounted pole 310.

These opposed, radially offset magnetic poles provide some radial stability; however, under these circumstances, there is less room for the magnetic pole 330 which provides the radial stability so that the radial stiffness is somewhat diminished. Turning to FIG. 3B, a comparison of the measurements of radial attractive force chain in FIGS. 3A and 3B dramatically illustrate the change in effectiveness of overcoming radial deflection between the embodiment of FIG. 2 and FIG. 3. Specifically, in to FIG. 2B, the radial stability of the slope of the force versus deflection in the radial direction provides a stiffness equal to 2120N/M while in FIG. 3B the embodiment alters the radial stiffness to 3155N/M.

Figure 3A:
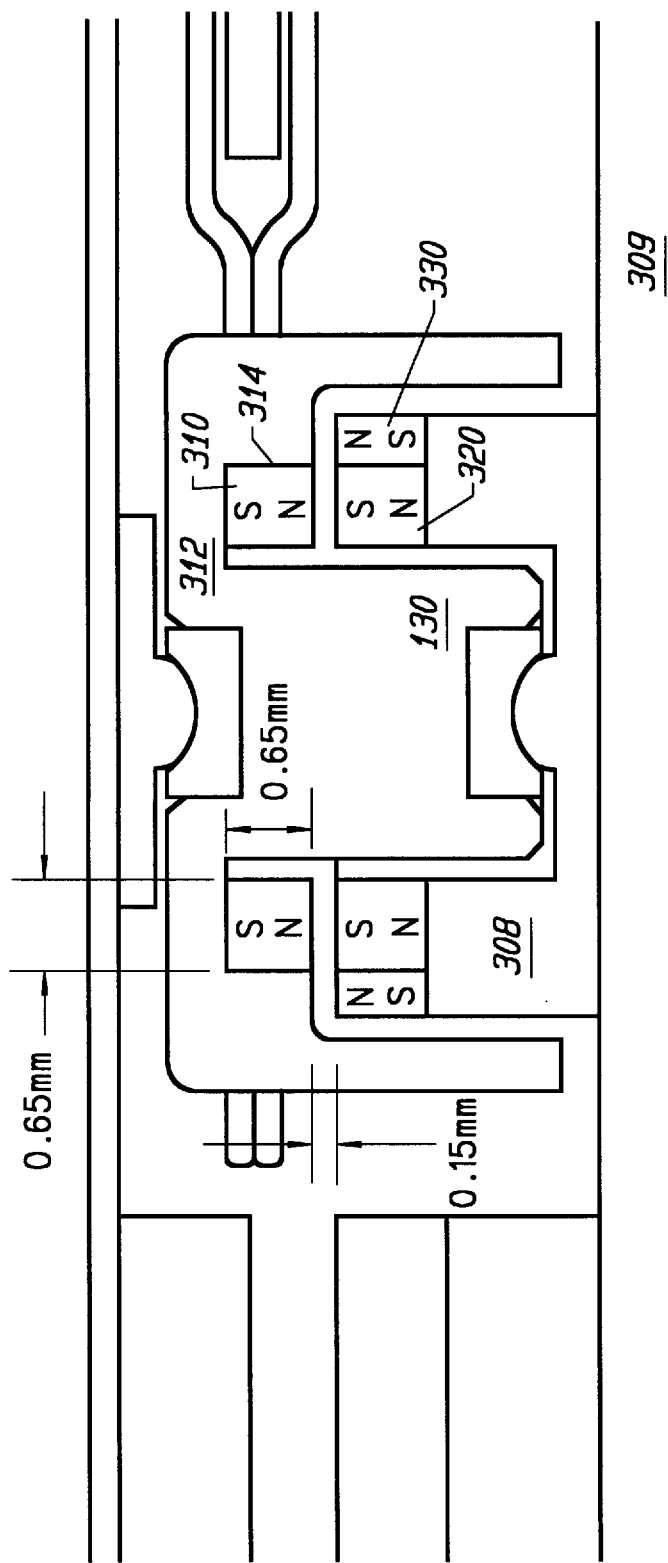
FIG. 3A is a vertical sectional view of an information storage disc cartridge in accordance with the present invention utilizing a third embodiment of the magnetic bearing hub.
Figure 3B:
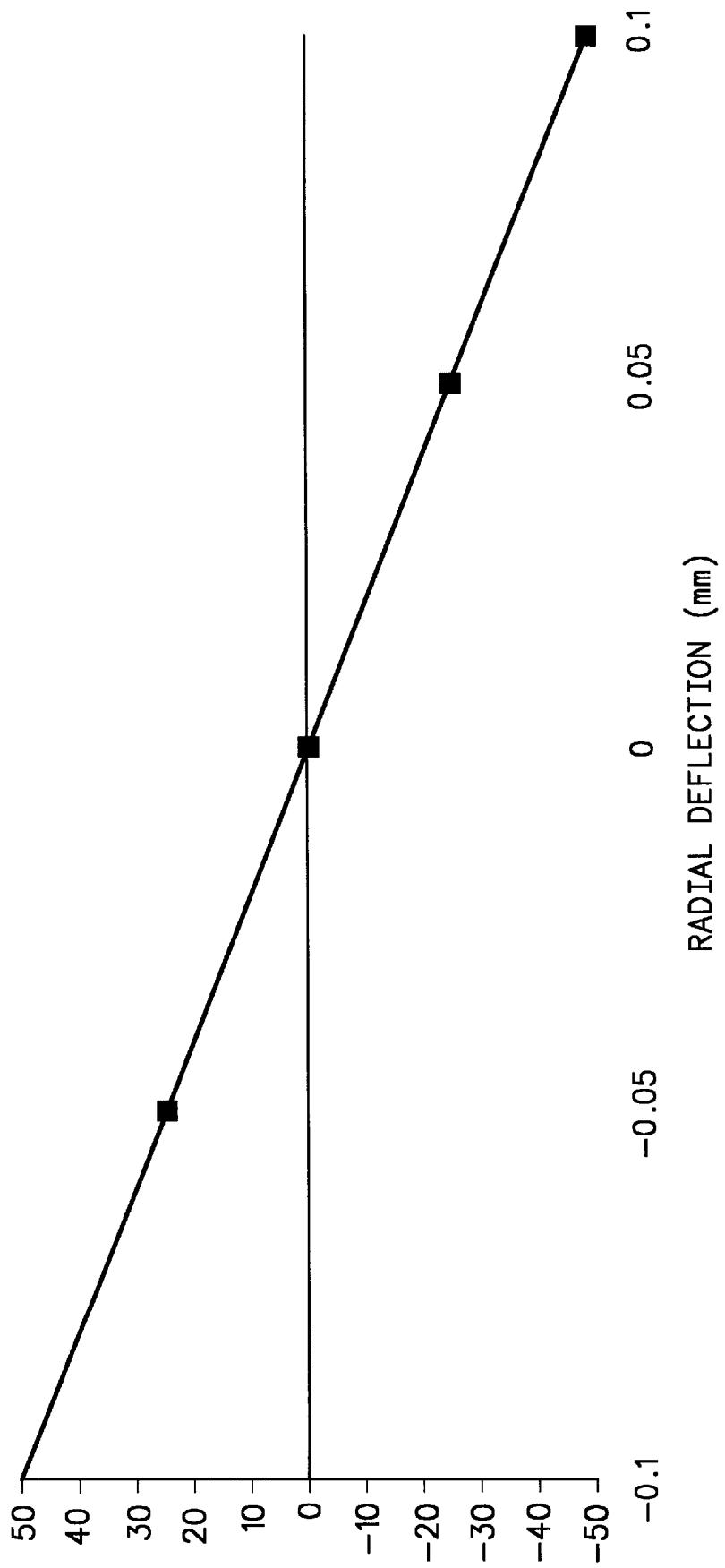
FIG. 3B is a graph of the radial repulsive forces vs. deflection distance for the configuration of FIG. 3A.
Figure 3C:
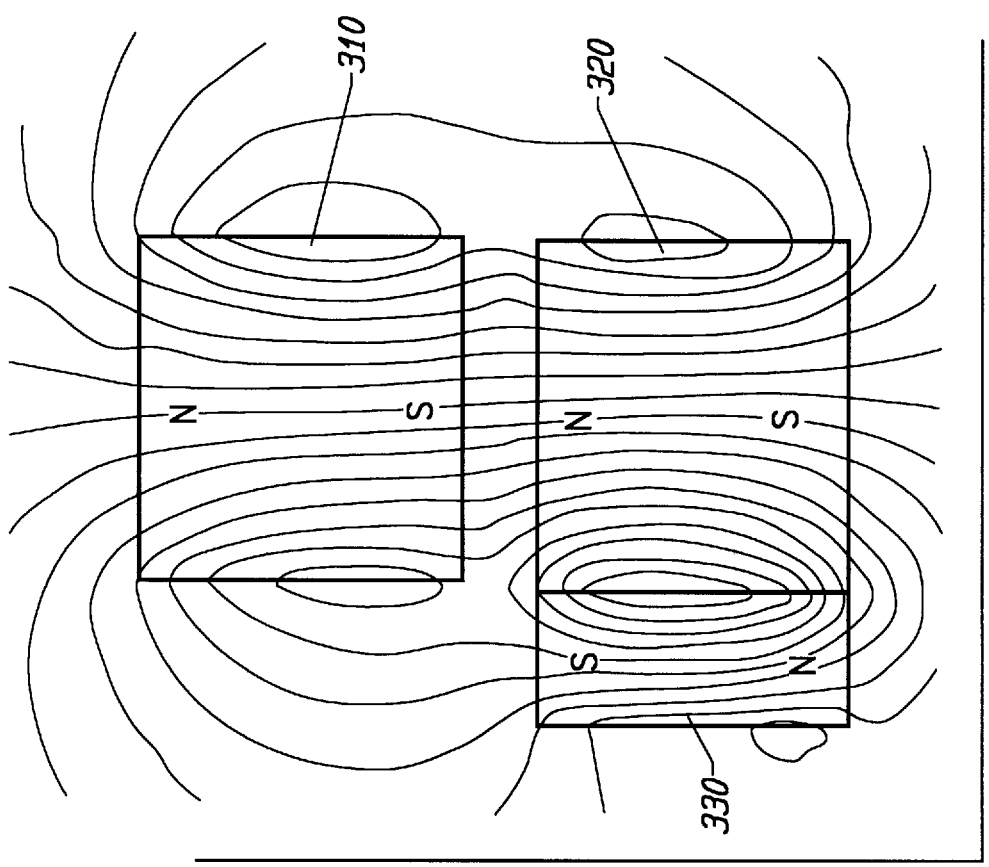
FIG. 3C is a chart of the flux patterns generated by the magnets used in the magnetic bearing hub of the embodiment of FIG. 3A.

In contrast, the axial force on the pivot or preload increases from 0.65N in the embodiment of FIG. 2A to 0.95N in the embodiment of FIG. 3A>SO as with many designs, tradeoffs must be made based on the need for certain forms of stability of the likelihood of certain shocks being imposed. Once again FIG. 3C shows the direct strong lines of flux flowing between pole piece 310 and pole piece 320 demonstrating the strong attractive forces which develop a strong axial preload. This same diagram illustrates the diminished flux and thus the diminished repulsion in the radial direction which will occur between the pole piece 310 and the oppositely aligned pole piece 330 which is provided to overcome radial deflection.

The design of FIG. 3A does establish a combination of forces which provide both axial preload forces and radial stabilizing force. Referring again to FIG. 3A, the base support 308 is fixed to or integral with the base casting 309; the hub 130 is free to rotate and thus to move away from support 308. The axial preload force attracts the freely movable hub 312 toward the fixed base 308 and prevents this axial movement. Similarly radial, repulsive forces between magnets 310 and 330 prevent one side or the other of movable hub 312 from tilting toward base 308, providing a highly stable design.

Figure 4:
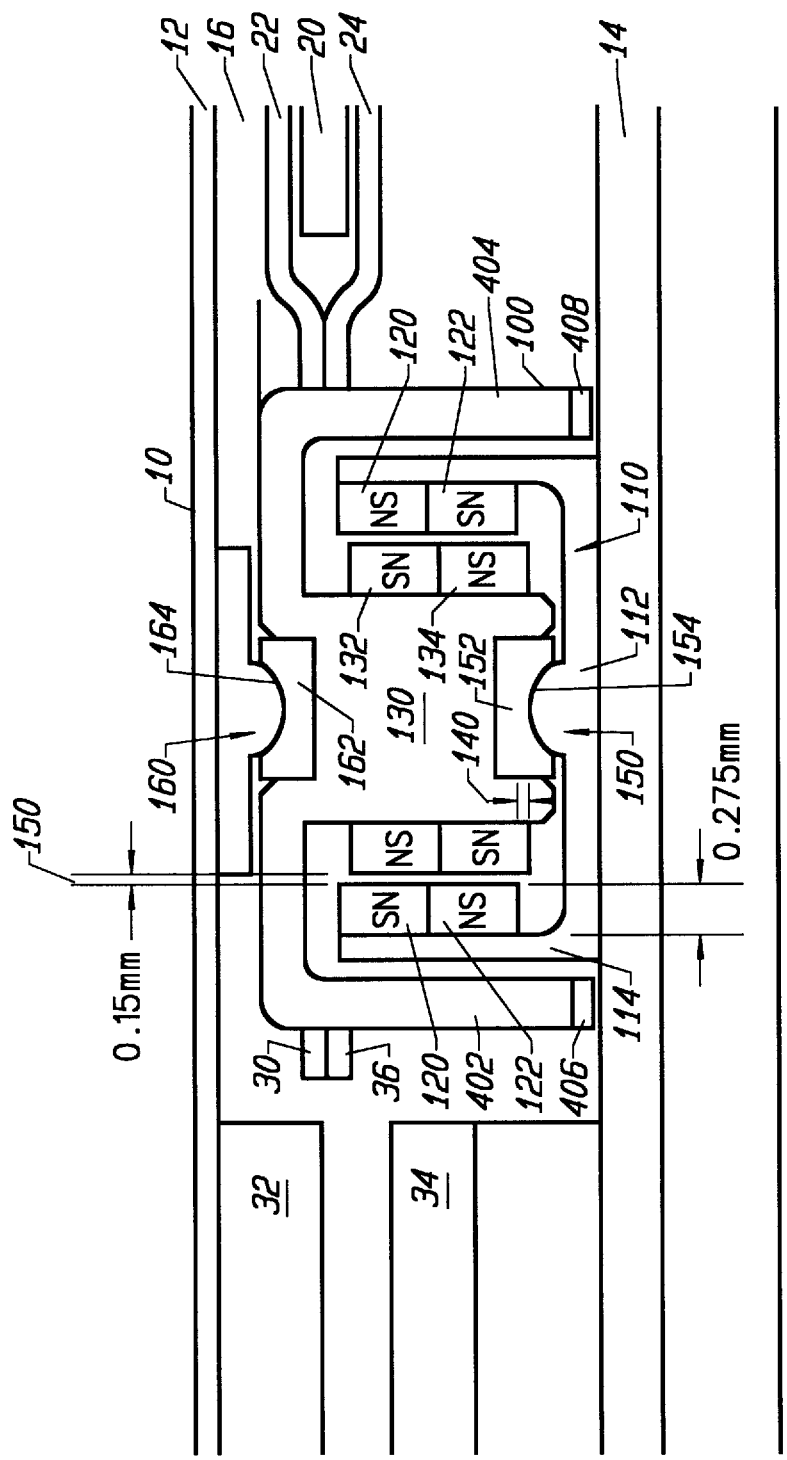
FIG. 4 illustrates an alternative embodiment of FIG. 1A incorporating a magnetic seal.

A further modification to damp any tilting movements may be utilized with any of the above embodiments. It simply involves forming or defining a magnetic seal across the gaps defined between the hub and base. For example, referring to FIG. 4, the vertical arms 402, 404 of hub 100 can be extended to form a small gap 406, 408 with base 14. By adding small magnets to the end of the hub arms and the aligned region of the base, and a small amount of ferro fluid in the gap 406, 408, a magnetic seal is now formed. This allows a damping fluid to fill the region between base 110 and hub 100, damping any tilting by the hub.

It is also possible to form such a magnetic seal by taking advantage of the fringing fluid of the magnets used to stabilize the hub.

It has been projected that cartridges based on the design shown herein could have overall heights of 0.0197" or less. Thus, the design disclosed and claimed herein has significant utility for achieving the manufacture of small cartridges holding information storage discs.

Whereas many modifications to the present invention will no doubt become apparent to one skilled in the art, after having read the foregoing description, it is to be understood that the particular embodiment shown and described by way of illustration is not intended to be limiting. For example, alternate ways of mounting the magnetic pole pairs may become apparent to a person who studies this disclosure without departing from the spirit and scope of the invention. The magnetic pivot disclosed herein may find other uses than in the specific information storage device disclosed here. Moreover, the pivot could support the magnet rather than the coil of the voice coil motor. Therefore, reference to the details of the illustrated diagrams is not intended to limit the scope of the claims which themselves recite the features of the present invention.

What is claimed is:

1. A magnetic bearing assembly for a rigid disc recording unit comprising a base, a cover with said base, a cavity, a central hub having a central portion disposed within said cavity supporting on one side an element of a motor for moving said hub and on the opposite side an actuator arm having a transducer for movement over an information storage disc, said magnetic bearing assembly permitting rotational movement of said hub within said cavity while providing significant axial preload to prevent tilting of said hub and radial stiffness to prevent radial displacement of said hub, said hub being supported at the top and bottom thereof for rotation about a longitudinal axis and supporting on an outer surface of said central portion a pair of disc-shaped axially aligned radially polarized passive magnetic poles and said central hub rotating within a sleeve supporting on an inner surface thereof a pair of disc-shaped vertically aligned, oppositely radially magnetically polarized passive magnets vertically offset from said hub mounted magnetic poles so that said hub mounted magnetic poles repel said sleeve mounted magnetic poles to provide radial stiffness for said hub while said misalignment of said oppositely polarized magnetic poles creates a magnetic force which axially preloads said hub, said sleeve and said hub are circular and said hub extends from said central portion disposed within said sleeve over a top end of said sleeve such that the inside of said hub surrounds the outside of said sleeve, said hub supporting said actuator arm for rotation on an exterior surface of said hub which is outside of said sleeve so that said transducer is shielded from said disc-shaped magnetic poles on said sleeve and said hub.

2. A magnetic bearing assembly as claimed in claim 1 wherein each of said hub and said sleeve support a plurality of vertically aligned oppositely radially polarized magnets vertically offset from each other.

3. A magnetic bearing assembly as claimed in claim 2 wherein each of said hub and said sleeve support two disc shaped radially polarized magnetic poles, the magnets on said sleeve being axially offset and radially magnetically opposed to the magnets on said hub.

4. A magnetic bearing assembly as claimed in claim 3 wherein said offset between said disc shaped poles supported on said hub is about ⅕ of the height of said poles supported on said sleeve.

5. A hub assembly as claimed in claim 3 wherein said hub mounted magnetic pole is mounted on an interior horizontal surface of said hub so that hub-mounted pole is directly aligned axially over said sleeve mounted attractively oriented magnetic pole.

6. A magnetic bearing assembly as claimed in claim 1 wherein said hub includes a support means extending horizontally over said sleeve and vertically adjacent said sleeve, said supporting means supporting on one portion thereof a coil for a voice coil motor, said supporting means supporting on an opposite portion thereof said actuator arm for extending said transducer over said surface of said information storage disc.

7. A magnetic bearing assembly as claimed in claim 6 wherein said supporting means extend vertically to a point closely adjacent said base and forming a small gap therebetween, said base and said vertical portions of said hub supporting means for defining a magnetic field across said gap and having a ferro fluid captured therein to thereby form a magnetic seal closing off said gap between said supporting means and said sleeve from said cavity whereby a damping fluid for damping tilting motions of said hub may be enclosed within said magnetic bearing assembly.

8. A magnetic bearing assembly as claimed in claim 7 wherein said offset between said disc shaped poles supported on said hub is about ⅕ of the height of said poles supported on said sleeve.

9. A magnetic bearing assembly as claimed in claim 1 including means for axially supporting said hub for rotation comprising a socket defined in an axially located top and bottom surface of said hub and a ball fixed to said base and said cover and rotating within said socket along a vertical access of said hub.

10. A magnetic bearing as claimed in claim 1 wherein said actuator arm is axially aligned with said motor element on an exterior surface of said hub so that said hub is balanced.

11. A magnetic bearing as claimed in claim 10 wherein said magnetic poles on said sleeve are radially offset toward said transducer mounting relative to said magnetic poles on said hub, establishing an axial preload force to stabilize said hub and said transducer.

12. A magnetic bearing as claimed in claim 1 wherein each of said radially polarized poles is aligned radially opposite to a next adjacent pole pair.

13. A magnetic bearing as claimed in claim 12 wherein said magnetic pole pairs is mounted on each of said hub and said sleeve.

14. A magnetic bearing assembly for a disc drive recording unit comprising a base, a cover secured to said base providing a cavity therebetween, an information storage disc supported in said cavity for storing information thereon and a hub for supporting an actuator arm having a transducer for movement over the surface of said disc, said hub having a central portion formed of non-magnetic material supporting on a first outer surface thereof a single axially polarized passive disc-shaped magnetic pole vertically aligned over a sleeve surrounding said central portion of said hub and supported from said base, said sleeve supporting on a second outer surface thereof an oppositely vertically polarized passive disc-shaped passive magnetic pole, magnetic material of said sleeve cooperating with said single axially polarized magnetic pole to provide axial preload of said hub, said sleeve mounted pole being oppositely polarized relative to said hub mounted pole and mounted radially outwardly of said hub mounted pole to provide radial stiffness to said hub to prevent deflection in the radial direction of said hub and the actuator supported by said hub, said sleeve and said hub are circular and said hub extends from said central portion disposed within said sleeve over a top end of said sleeve such that the inside of said hub surrounds the outside of said sleeve, said hub supporting said actuator arm for rotation on an exterior surface of said hub which is outside of said sleeve so that said transducer is shielded from said disc-shaped magnetic poles on said sleeve and said hub.

15. A magnetic bearing assembly as claimed in claim 14 including means for axially supporting said hub for rotation comprising a socket defined in a axially located top and bottom surface of said hub and a ball fixed to said base and said cover and rotating within said socket along a vertical access of said hub.

16. A magnetic bearing assembly as claimed in claim 14 wherein said supporting means extend vertically to a point closely adjacent said base and forming a small gap therebetween, said base and vertical portions of said hub supporting means for defining a magnetic field across said gap and having a ferro fluid captured therein to thereby form a magnetic seal closing off said gap between said supporting means and said sleeve from said cavity whereby a damping fluid for damping tilting motions of said hub may be enclosed within said magnetic bearing assembly.

17. A magnetic bearing assembly as claimed in claim 16 wherein said offset between said disc shaped poles supporting on said sleeve and said disc shaped poles supported on said hub is about one-fifth of the height of said poles supported on said sleeve or said hub.

18. A magnetic bearing as claimed in claim 14 wherein said actuator arm is axially aligned with said motor element on an exterior surface of said hub so that said hub is balanced.

19. A magnetic bearing as claimed in claim 14, said sleeve comprising magnetic material so that interaction of said first and second poles reinforces stiffness of said bearing assembly.

20. A magnetic bearing assembly for a disc drive recording unit comprising a base, a cover secured to said base providing a cavity therebetween, an information storage disc supported in said cavity for storing information thereon and a hub for supporting an actuator arm having a transducer for movement over the surface of said discs, said hub having a central portion formed of non-magnetic material supporting on an outer surface thereof a single axially polarized passive disc-shaped magnetic pole vertically aligned over a sleeve surrounding said central portion of said central hub which is not supporting said magnetic pole and having a radial dimension which overlies a substantial portion of said hub mounted magnetic pole, said sleeve supporting on an outer surface thereof an oppositely vertically polarized passive disc-shaped magnetic pole, said sleeve mounted pole being oppositely polarized relative to said hub mounted pole and mounted radially outwardly of said hub mounted pole to provide radial stiffness to said hub to prevent deflection in the radial direction of said hub and the actuator arm supported by said hub, said sleeve and said hub are circular and said hub extends from said central portion disposed within said sleeve over a top end of said sleeve such that the inside of said hub surrounds the outside of said sleeve, said hub supporting said actuator arm for rotation on an exterior surface of said hub which is outside of said sleeve so that said transducer is shielded from said disc shaped magnetic poles on said sleeve and said hub.

21. A magnetic bearing assembly as claimed in claim 20 including means for axially supporting said hub for rotation comprising a socket defined in a axially located top and bottom surface of said hub and a ball fixed to said base and said cover and rotating within said socket along a vertical access of said hub.

22. A magnetic bearing assembly as claimed in claim 20 wherein said supporting means extend vertically to a point closely adjacent said base and forming a small gap therebetween, said base and said vertical portions of said hub supporting means for defining a magnetic field across said gap and having a ferro fluid captured therein to thereby form a magnetic seal closing off said gap between said supporting means and said sleeve from said cavity whereby a damping fluid for damping tilting motions of said hub may be enclosed within said magnetic bearing assembly.

23. A magnetic bearing assembly as claimed in claim 22 wherein said offset between said disc shaped poles supporting on said sleeve and said disc shaped poles supported on said hub is about one-fifth of the height of said poles supported on said sleeve or said hub.

24. A hydrodynamic bearing assembly for a rigid disc recording unit comprising a base, a cover secured to said base, defining a cavity therebetween, an information storage disc for rotation in said cavity for storing information thereof, a hub having a central portion disposed within said cavity supporting an actuator having a transducer for moving said transducer over the surface of said disc, said hub supporting a first axially aligned passive disc-shaped magnetic pole, said hub rotating within a non-magnetic sleeve surrounding said central portion, said sleeve supporting at one end upwardly oriented portion thereof a second axially aligned passive disc-shaped magnetic pole oriented in an attractive mode towards said hub mounted magnet to create axial preload in said system, said non-magnetic sleeve further supporting said oppositely oriented axially aligned magnetic pole mounted radially outward of said hub mounted magnet and operating in the repulsion mode with said hub mounted magnet to provide radial stiffness to said hub, said sleeve and said hub are circular and said hub extends from said central portion disposed within said sleeve over a top end of said sleeve such that the inside of said hub surrounds the outside of said sleeve, said hub supporting said actuator arm for rotation on an exterior surface of said hub which is outside of said sleeve so that said transducer is shielded from said disc shaped magnetic poles on said sleeve and said hub.

25. A magnetic bearing assembly as claimed in claim 24 including means for axially supporting said hub for rotation comprising a socket defined in a axially located top and bottom surface of said hub and a ball fixed to said base and said cover and rotating within said socket along a vertical access of said hub.

26. A magnetic bearing assembly as claimed in claim 24 wherein said supporting means extend vertically to a point closely adjacent said base and forming a small gap therebetween, said base and vertical portions of said hub supporting means for defining a magnetic field across said gap and having a ferro fluid captured therein to thereby form a magnetic seal closing off said gap between said supporting means and said sleeve from said cavity whereby a damping fluid for damping tilting motions of said hub may be enclosed within said magnetic bearing assembly.

27. A magnetic bearing assembly as claimed in claim 26 wherein said offset between said disc shaped poles supporting on said sleeve and said disc shaped poles supported on said hub is about one-fifth of the height of said poles supported on said sleeve or said hub.

28. A bearing assembly as claimed in claim 24 wherein said first magnetic pole is mounted from a horizontal surface portion of said hub.

29. A bearing assembly as claimed in claim 28 wherein said first magnetic pole is spaced on axial surface of said hub so that first magnetic pole is axially directly aligned with said second magnetic pole.

30. A bearing assembly as claimed in claim 29 wherein a third magnetic pole is immediately adjacent said second magnetic pole.

31. A magnetic bearing as claimed in claim 30 wherein said actuator arm is axially aligned with said motor element on an exterior surface of said hub so that said hub is balanced.

* * * * *